June 7, 1960     J. R. HUBER     2,939,263
HARVESTER REEL FINGER ACTUATING MEANS
Filed March 19, 1958     2 Sheets-Sheet 1

INVENTOR:
JOHN R. HUBER
BY: Emerson B Donnell
ATTORNEY

June 7, 1960  J. R. HUBER  2,939,263
HARVESTER REEL FINGER ACTUATING MEANS
Filed March 19, 1958  2 Sheets-Sheet 2
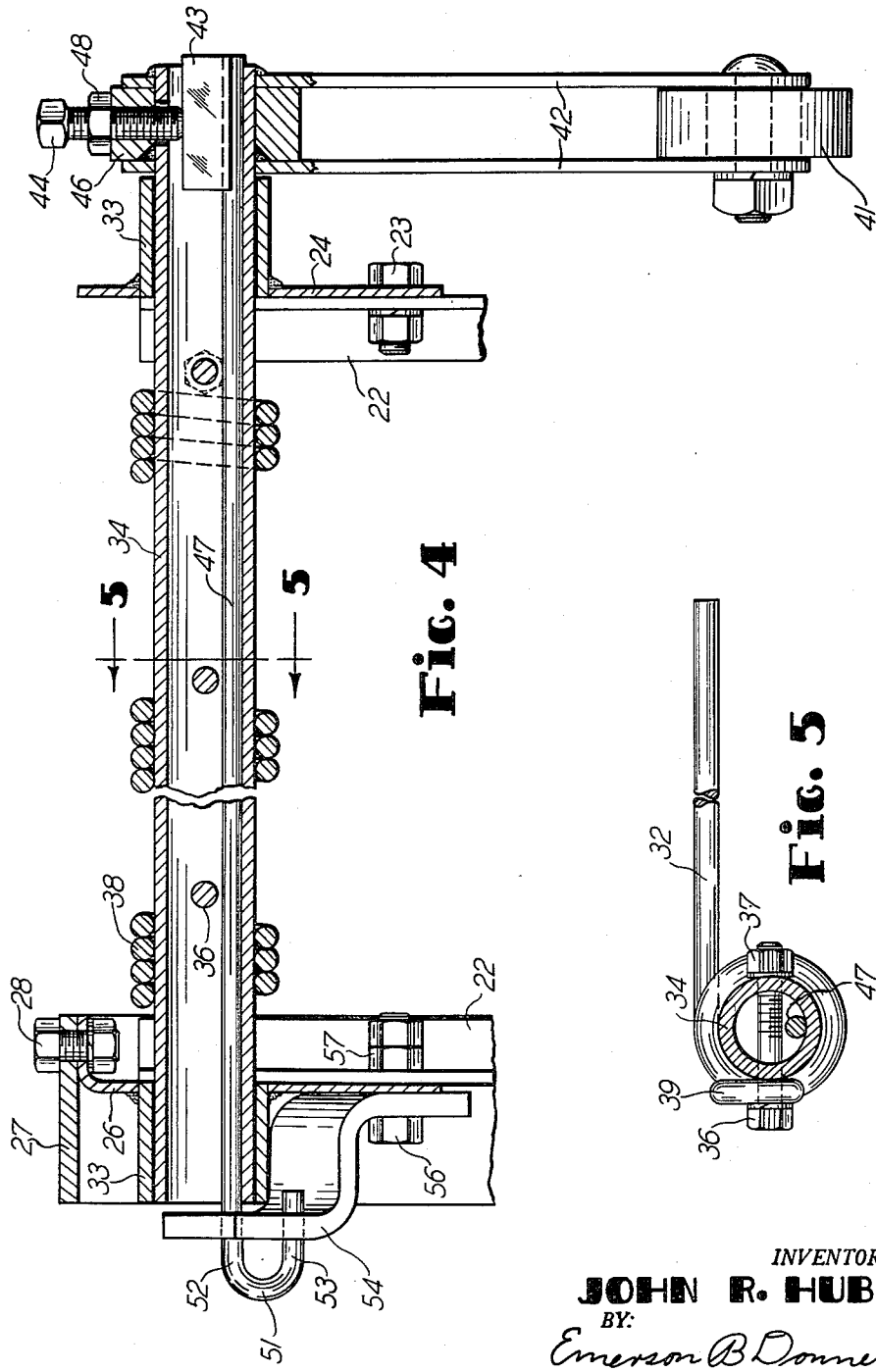
INVENTOR:
JOHN R. HUBER
BY:
Emerson B Donnell
ATTORNEY 2,939,263
Patented June 7, 1960

2,939,263
HARVESTER REEL FINGER ACTUATING MEANS

John R. Huber, Bettendorf, Iowa, assignor to J. I. Case Company, Racine, Wis., a corporation of Wisconsin Filed Mar. 19, 1958, Ser. No. 722,432

4 Claims. (Cl. 56—226)

This invention relates to a reel for a forage harvester and, particularly, it relates to a means for actuating the pickup fingers on the reel.

It is an object of this invention to provide an improved means for actuating the pickup fingers on a harvester reel. In expressing this object, it is observed that pickup reels with movable spring fingers are well known in the harvester art. Thus no claim is made herein for that which is well known, but rather the invention object is to provide the improvement mentioned so that the reel will be more reliable in its action and sturdier in structure and thereby require less maintenance and cause less lost time due to machine failures.

Another object of this invention is to provide a pickup reel, of the type with fingers movable with respect to the reel, wherein the movement of the fingers is induced by a means which is adjustable in the field.

Still another object is to provide a pickup reel, of the type with several rows of fingers rockable with respect to the reel, wherein each row of fingers is positively rocked in one direction and impositively rocked in the other direction by improved resilient means including a torsion bar.

Other objects and advantages will become apparent upon reading the following description in light of the accompanying drawings, wherein:

Fig. 4 is an enlarged partly sectional view of the mechanism shown in Fig. 2, with the section being substantially along the line 4—4 of Fig. 2.

Fig. 5 is a sectional view taken on the line 5—5 of Fig. 4.

The same reference numerals refer to the same parts throughout the several views.

Figure 1:
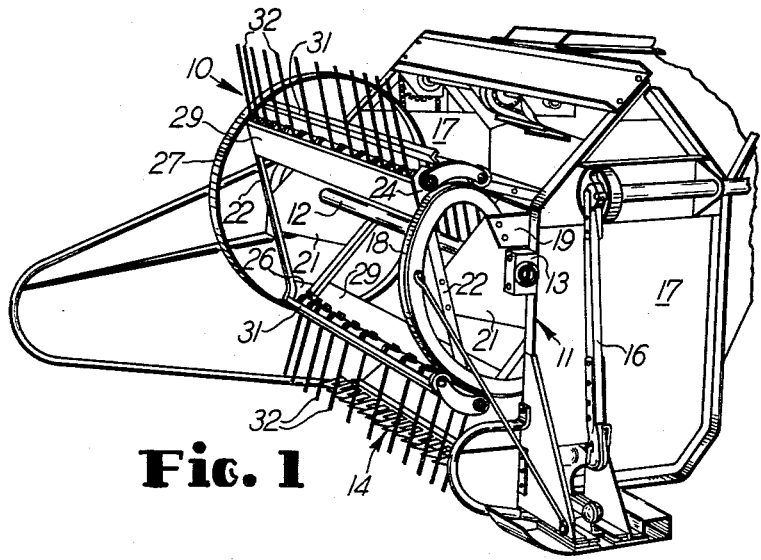
Fig. 1 is a perspective view of a fragment of a crop pickup unit incorporating a preferred embodiment of this invention.

Fig. 1 shows the front end of a harvester unit of the type employing a cutter bar, and the unit generally includes a reel 10 rotatably disposed on the frame 11 of the unit with the reel shaft 12 being, of course, centrally located with respect to the reel and rotatably mounted in bearings on the sides of the frame 11, such as the bearing 13. The usual cutter bar and sickle combination 14 is also included in the unit to be actuated by the pitman 16 so that crops which are in the path of the unit as the latter is towed over the field will be cut by the assembly 14 and guided by the reel 10 into the unit between the side pieces 17 of the harvester unit. It should thus be understood that the harvester is conveyed over the field with the reel rotating counter-clockwise, as viewed from the near end in Fig. 1, and the conventional drive mechanism, such as the chain and sprocket for rotating the reel 10, is on the far side of the unit and is, therefore, not visible in Fig. 1. However, all of the parts heretofore mentioned are conventional and, therefore, need not be further described. Also, it is customary to attach a stationary cam track 18 to one side of the harvester unit, in such a manner that the track is secured at one end to the frame 11 by the plate 19 while the lower end of the irregularly shaped cam track 18 is secured to the inside of the sheet 17.

Figure 2:
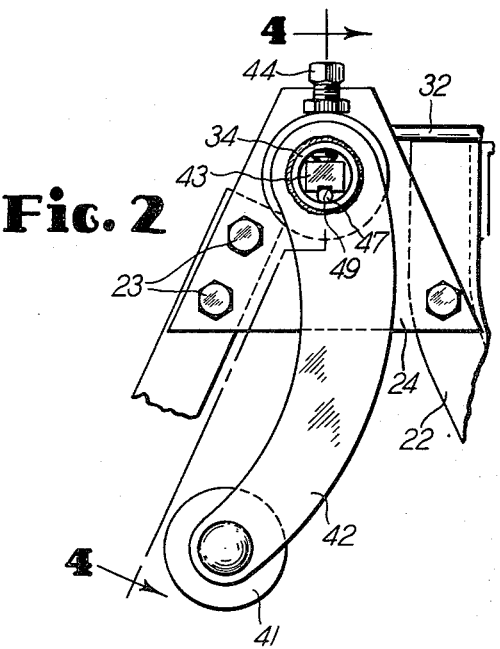
Fig. 2 is an enlarged side elevational view of a fragment of the mechanism shown in Fig. 1 with the parts in a different position.
Figure 3:
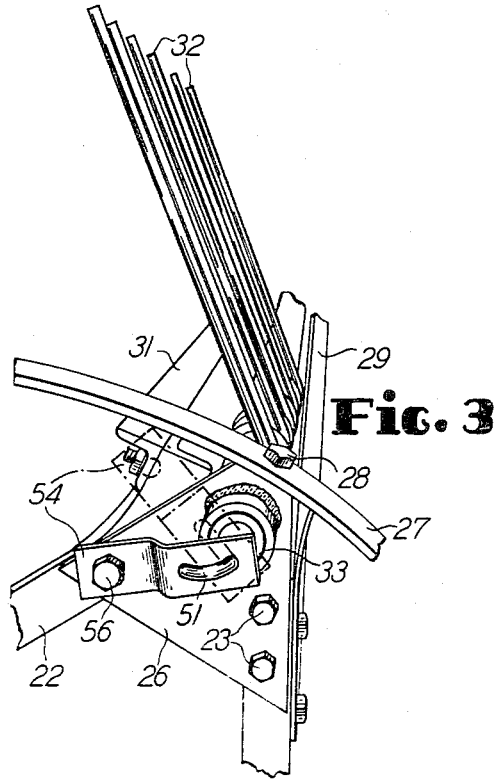
Fig. 3 is an enlarged perspective view of a fragment of the mechanism shown in Fig. 1 but taken from the side opposite thereto and showing in dot-dash lines a part in a second position.

Figs. 1 through 4 show that the reel 10 includes a pair of hub plates 21 secured at opposite ends of the reel shaft 12 to rotate with the latter, and the plates 21 are suitably secured, such as by bolts, to angle irons 22 which extend beyond the plates 21 and have attached thereto, by bolts 23, generally triangularly shaped plates 24 and 26 located at opposite ends of the reel 10. Fig. 1 indicates that there are three such pairs of plates 24 and 26 equally spaced around the reel 10, and the plates 26 are shown to be attached to a hoop 27 by means of bolts, such as the bolt 28 shown in Figs. 3 and 4, the whole constituting a support for a plurality of tubular shafts as will be described. Figs. 1 and 3 show stop plates or members attached across the length of the reel 10 with a front stop member 29 and a rear stop member 31 with each disposed adjacent opposite edges of each pair of plates 24 and 26.

The important feature of this invention is the means for rocking or rotating the spring fingers or tines 32 which are disposed on the reel 10 in three rows, as shown in Fig. 1. The plates 24 and 26 are actually bearing plates which include the bearings 33 secured to the plates by welding or the like, and each pair of bearings 33 rotatably supports a tubular shaft 34 extending across the length of the reel 10. Each shaft 34 has a plurality of the spring fingers 32 spaced therealong and secured to the shaft by means of the bolts 36 passing through the shaft 34 and being attached thereto by nuts 37, as best shown in Fig. 5. Also, note that in Figs. 4 and 5 the spring fingers 32 have coils 38 which are disposed around the shaft 34 with ends 39 of the fingers 32 being formed to be retained by the bolts 36. Thus, the fingers 32 are secured to the shaft 34 for rotation with the shaft, but the fingers have no rotation with respect to the shaft, other than their flexing action. The fingers 32 can thus be rocked, along with the rocking movement of the shaft 34, within the limits of the stops 29 and 31 extending across the reel 10, as described.

As previously mentioned, cam 18 is attached to one side of the pickup and cutter unit, and this cam is engaged by a roller cam follower 41 which is secured to the extended ends of a pair of arms 42 which are shown welded to one end of the shaft 34 so that, upon rotation of the reel 10, the cam followers ride on the cam 18 to transmit the cam action to the shafts 34 and thereby rock the latter. Each shaft 34 has the cam and cam follower and the cam action mentioned. The end of each shaft 34 having the cam follower also has a clamp block 43 disposed mainly within the tubular shaft 34, and a set screw 44 is threaded through a collar 46, which is welded to the shaft 34, so that the inner end of the screw 44 will bear against the clamping block 43 and press the latter against a torsion bar or rod 47 extended through the length of the shaft 34. A lock nut 48 is provided on the screw 44 for maintaining the latter in the desired locked position, and also one side of the block 43 is provided with a groove or cut-out 49 which receives a part of the curvature of the rod 47, as best shown in Fig. 2. With the arrangement described, it should be understood that the torsion bar 47 is disposed to one side within the shaft 34 and is secured against rotation therewithin in a fixed position at the location of the clamping block 43.

The opposite end of the bar 47 is shown to include the U-shaped end 51 having legs 52 and 53 which pass through a bracket or tie strap 54 in two spaced apart locations, as shown in Figs. 3 and 4, and the bracket 54 extends offset from the rod 47, and a bolt 56 secures the extended end of the bracket 54 to the plates 26 and the angle piece 22. The rod 47 is made of a special spring material so that it can serve as a torsion bar, and it will then be seen that, if the bracket 54 is placed in the dot-dash line position of Fig. 3 and the set screw 44 is turned down against the clamping bar to secure the adjacent end of the rod 47 in a fixed position, then, upon rotating the bracket 54 to the full line position of Fig. 3 and securing the bracket with the bolt 56, the rod 47 will be placed under a torsion which will exert an urging force of rotation on the shaft 34 to yieldingly maintain the cam follower against the cam. With this arrangement, the direction of bias of the rod 47 on the shaft 34 is opposite to the direction of rocking of the shaft 34, as induced by the cam and follower described and, therefore, between the torsion bar 47 and the cam and follower, the shaft 34 is completely physically controlled in both directions of rocking motion. The cam action increases the torsion in the bar 47 as the follower moves toward the front of the cam. Thus, as the reel 10 rotates about the axis of its shaft 12, the spring fingers 32 are actuated to suitable positions to sweep a maximum amount of crop into the harvester unit as the fingers 32 come toward the cutter bar and sickle assembly 14, and when the row of fingers 32 passes the assembly 14 and the follower is free of the cam, then the torsion bar rotates the row of fingers in the direction which will cause the fingers to deposit the crop into the harvester unit rather than to carry the crop around to the top of the reel 10. As shown in Fig. 1, the cam followers are in contact with the cam only through the front half or so of rotation of the reel 10 so that in the rear half or, that is, the half behind the vertical plane of the shaft 12, the torsion bars 47 are urging the shafts 34 in the direction opposite to that urged by the cam followers. It will also be understood that each shaft 34 has the same arrangement as shown in all of the drawings so that each row of fingers 32 is rocked as described.

In setting the torsion bar wire in position with respect to the shaft 34 and the attending parts, the set screw 44 can be loosened when the cam follower is in a position such as that shown in Fig. 2. The bolt 56 is then removed, and the bracket 54 is placed up to the dot-dash line position shown in Fig. 3, so that the upper corner of the bracket thus abuts the hoop 27, which is then a guide or stop for the bracket. Next, the set screw 44 is tightened to secure the one end of the torsion wire 47, and then the bracket 54 is placed in the full line position shown in Fig. 3, and the bolt 56 is replaced as shown to secure the bracket in the full line position. Figs. 4 and 5 show that the bolts 36 securing the spring fingers to the shaft 34 are available for limiting the movement of the torsion bar 47 around the interior of the shaft 34 so, when the bracket 54 is rotated to twist the bar 47, the latter will not get out of the desired position on the inside of the shaft 34.

It will thus be understood that the setting of the torsion bar 47 is accomplished while the cam follower 41 is not in contact with the cam, and thus the bar 47 will be disposed in the position shown in Fig. 4, and the fingers 32 will be substantially horizontal. When the follower contacts the cam, the bar 47 has an additional torsion placed in it so that the bar may actually be deflected sufficiently to contact at least the end one of the bolts 36 to bias the rotated position of the shaft 34, as mentioned. It will also be noted that the bolt 56 retaining the tie strap or bracket 54 is provided with two nuts 57, and thus the bolt 56 can be free an amount sufficient to allow the strap 54 to pivot in its mounting, if desired, as the torsion of the bar 47 is applied to the strap 54.

While a specific embodiment of this invention has been shown and described, it should be obvious that certain changes could be made therein, and the scope of this invention should, therefore, be limited only by the appended claims.

What is claimed is:

1. In an actuating spring for use in a reel for a crop harvester or the like of the type employing a plurality of hollow rock shafts each having a row of spring fingers extending transversely therefrom, a cam follower on one end thereof and a cam fixed to engage said cam follower upon rotation of said reel, the combination with each shaft of a torsion bar disposed in the hollow interior of said shaft and extending therealong, a clamp on one end of said torsion bar securing one end of said torsion bar to said shaft, and a bracket attached to the other end of said torsion bar and attached to said reel for securing said torsion bar in a twisted condition opposite to the direction of rocking movement of said shaft as induced by said cam follower.

2. In an actuating spring for use in a reel for a crop harvester or the like of the type employing a reel hub with a shaft rockably mounted on said hub and having a row of fingers attached thereto, rockable with said shaft and extending therefrom, and employing a cam and a cam follower on one end of said shaft for engagement with said cam upon rotation of said reel, the combination of a torsion bar disposed inside and along said shaft and being of a spring material for withstanding a twisting force, a clamp at one end of said torsion bar for securing the latter to said shaft, the other end of said torsion bar having its free end disposed to form a U-shaped end, and a bracket attached to both legs of said U-shaped end and extending therefrom to a position offset from said torsion bar, and said bracket being attached to said reel hub at said position offset from said torsion bar.

3. In an actuating spring for use in a reel for a crop harvester or the like of the type employing a reel hub with a hollow shaft rockably mounted on said hub having a row of fingers attached thereto, rockable with said shaft, extending therefrom and employing a cam on said harvester and a cam follower on one end of said shaft for engagement with said cam upon rotation of said reel, the combination of, a plurality of bolts transversely extending through said shaft for attaching said fingers to said shaft to rock therewith, a torsion bar disposed inside and along said shaft adjacent said bolts and being of a spring material for withstanding a twisting force, a clamp releasably connected to one end of said torsion bar for securing the latter to said shaft, the other end of said torsion bar having its free end disposed to form a U-shaped end, and a bracket attached to both legs of said U-shaped end and extending therefrom to a position offset from said torsion bar and said bracket being attached to said reel hub at said position offset from said torsion bar.

4. In an actuating spring for use in a reel for a crop harvester or the like of the type employing a reel hub with a hollow shaft rockably mounted on said hub, having a row of fingers attached thereto rockable with said shaft and extending therefrom, and employing a cam on said harvester and a cam follower on one end of said shaft for engagement with said cam upon rotation of said reel, the combination of a torsion bar disposed inside and along said shaft and being of a spring material for withstanding a twisting force, a clamp releasably connected to one end of said torsion bar for securing the latter to said shaft in a non-rotatable position with respect to said shaft, the other end of said torsion bar projecting from the other end of said shaft, a bracket attached to said other end of said torsion bar and extending therefrom to a position offset from said torsion bar, and means on said reel for securing said bracket to said reel in said offset position and rotated for subjecting said torsion bar to a twisting force.

References Cited in the file of this patent
UNITED STATES PATENTS

| | | |
|---|---|---|
| 2,417,482 | Gacki | Mar. 18, 1947 |
| 2,694,894 | Linscheid | Nov. 23, 1954 |
| 2,779,602 | Kimbro et al. | Jan. 29, 1957 |